Inventors
CYRIL F. DRAKE
MICHAEL L. GAYFORD
By Percy P. Lantzy
Attorney

Inventors
CYRIL F. DRAKE
MICHAEL L. GAYFORD
By [signature]
Attorney

United States Patent Office 3,445,596

Patented May 20, 1969

3,445,596

CAPACITOR MICROPHONE EMPLOYING A FIELD EFFECT SEMICONDUCTOR

Cyril Francis Drake and Michael Lawrence Gayford, Harlow, England, assignors to International Standard Electric Corporation, New York, N.Y., a corporation of Delaware Filed Feb. 3, 1966, Ser. No. 524,794
Claims priority, application Great Britain, Apr. 13, 1965, 15,677/65
Int. Cl. H04m *1/00;* H04r *1/04, 15/00*
U.S. Cl. 179—1 6 Claims

ABSTRACT OF THE DISCLOSURE

A capacitor microphone consisting of a capacitor and a field effect transistor preamplifier integrally constructed having a movable plate of the capacitor peripherally fastened to a continuous annular wall of semiconductor material of the field effect transistor and a stationary capacitor plate formed by a surface of the bulk material of the field effect transistor.

This invention relates to electromechanical transducers.

Electromechanical transducers of the electrostatic type, for example, capacitor microphones, are attractive per se on account of small size, simplicity and a periodic response. Transducers of this type are, however, of high impedance as compared with, for example moving coil transducers, and must be used with some form of preamplifier or impedance matching stage.

According to the invention, there is provided an electromechanical transducer of the electrostatic type including a vibratable front capacitor plate spaced from a back capacitor plate formed by a surface of a body of semiconductor material in which is formed a semiconductor amplifier device for amplifying the electrical output of the transducer.

Embodiments of the invention will now be described with reference to the accompanying drawings in which.

Figures 1, 2, 3, 4, 5, 6, 7, 8, 9, 10, 11, 12, 13, 14:
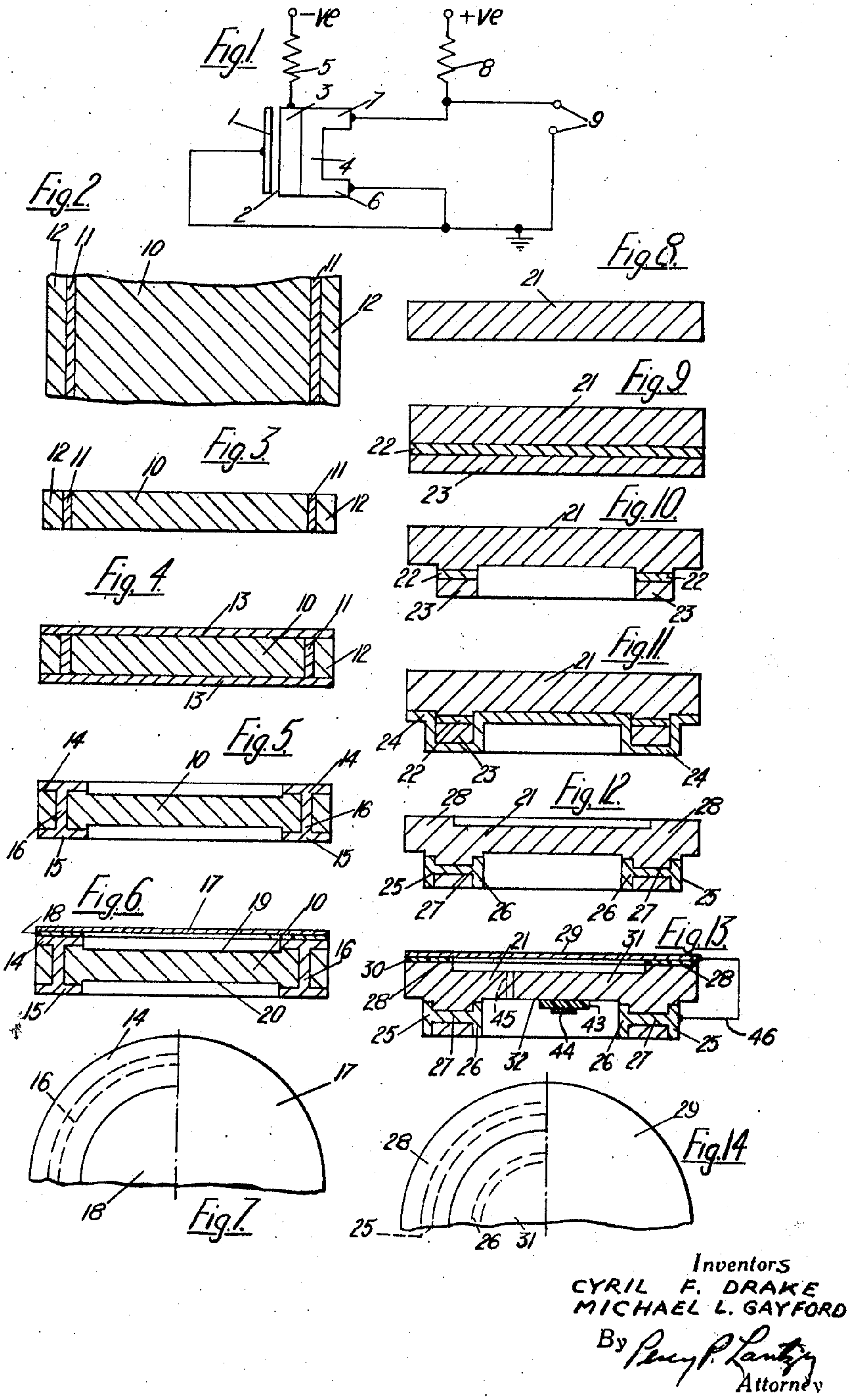
FIG. 1 shows in part circuit diagram and part schematic constructional detail, an electromechanical transducer embodying the invention.
FIGS. 2 to 6 are sectional views, and FIG. 7 a partial half sectioned plan view of FIG. 6, illustrating successive steps of manufacturing one form of the transducer of FIG. 1.
FIGS. 8 to 13 are sectioned views, and FIG. 14 a partial half sectioned view of FIG. 13, illustrating successive steps of manufacturing another form of the transistor of FIG. 1.

Referring to FIG. 1, an electromechanical transducer of the electrostatic type is formed by a vibratable front capacitor plate 1 spaced from a back capacitor plate formed by the surface 2 of a p-type gate region 3 of a junction field-effect transistor having an n-type channel 4.

The front capacitor plate 1, which includes or consists of any suitable conducting material, and may typically comprise a suitable acoustic diaphragm for example of plastic with a conducting coating on one major surface, may be spaced from the surface 2 by being peripherally fastened into a capsule containing the transistor, or preferably is fastened to the body of the transistor itself. This will be described later.

The p-n junction of the transistor is reverse biased by a source of negative potential via a resistance 5 having a resistive impedance matching that of the transducer. The transistor is connected in a grounded source configuration with the source 6 connected to the front capacitor plate 1 and the drain 7 connected to a source of positive potential via a load resistor 8.

In operation, variation in the electrostatic capacitance between the plates 1 and 2 produces an electrical signal which is amplified by the field effect transistor, the amplified signal being taken from output terminals 9.

In one method of manufacturing the transducer, a single crystal rod 10 (FIG. 2) of 0.01 ohm cm. p-type silicon with a diameter of 2 cm., has epitaxially deposited around its periphery a layer 11 of 1 ohm cm. n-type silicon having a thickness of $10\mu$, followed by an overall layer of 12 of 0.01 ohm cm. p-type silicon having a thickness of $25\mu$.

The rod 10 is then cut into slices, one such slice being shown in FIG. 3, and having a thickness of $150\mu$.

Each major surface of the slice has epitaxially deposited thereon a layer 13 (FIG. 4) of 0.01 ohm cm. n-type silicon having a thickness of $10\mu$.

A central circular region of each layer 13 is then removed together with a little of the underlying material 10, for example by a localized stream of fluid entrained abrasive particles.

A total thickness removal of some $12\frac{1}{2}\mu$ from each major surface of the slice results in the shape shown in FIG. 5. The remaining rings of the layers 13 are interconnected by the ring of the layer 11 through the thickness of the slice.

This results in the formation of a junction field effect transistor with the rings on opposite side constituting the source 14 and drain 15, of n-type silicon, interconnected by the channel 16, and the bulk material 10 constituting the gate, of p-type silicon.

As shown in FIGS. 6 and 7, a vibratable front capacitor plate 17 is conductively fastened to the top of the source ring 14. If a metal coated plastic diaphragm is used to form the front capacitor plate 17 this may be fastened by low temperature or plastic solder 18, or by a conducting adhesive, with the metal coating facing the ring 14. Alternatively, the metal coat may be in front, electrical connection being made separately to this. The surface 19 of the bulk semiconductor material bounded by the source ring 14 to which the front capacitor plate is fastened, forms the back capacitor plate.

The other major surface region 20 of the bulk semiconductor material bounded by the drain ring 15 provides a suitable site for the laying down by known techniques of the resistances 5 and 8 of FIG. 1 in the form of solid state circuit components. It will be clear that a suitable insulating layer, for example $SiO_2$ must first be deposited or formed on the surface 20 before the resistors are deposited.

In the alternative construction outlined in FIGS. 8 to 14, the field effect transistor has a source and drain of p-type silicon, and a gate of n-type silicon, so that whereas the construction of FIGS. 6 and 7 in operation is connected to the biasing potentials as in FIG. 1, appropriate reversal of potentials will be required for the construction now to be described.

A slice 21 (FIG. 8) of single crystal 0.01 ohm cm. n-type silicon, having a thickness of $150\mu$ and a diameter of 2 cm., has epitaxially deposited on one major surface a layer 22 (FIG. 9) of 5 ohm cm. p-type silicon having a thickness of $10\mu$, followed by a layer 23 of 0.01 ohm cm. n-type silicon having a thickness of $20\mu$.

Portions of the layers 22 and 23 and the underlying portions of the bulk material 21 are air-abraded with a suitable mask to a depth of $35\mu$ to leave a ring of the layers 22 and 23 (FIG. 10).

Over this shaped major surface is epitaxially deposited a layer 24 (FIG. 11) of 0.01 ohm cm. p-type silicon having a thickness of 10$\mu$.

The layer 24 is then removed by air-abrasion using a suitable mask (FIG. 12) except on the sides of the ring 22/23. The junction field effect transistor so formed has a source 25 and a drain 26 formed by outer and inner sides respectively of the multiple layer ring and interconnected by the channel 27, the gate being formed by the remaining bulk material 21.

The other major surface of the bulk material 21 is air abraded to a depth of some 12½$\mu$ by air abrasion to leave a ring 28 upstanding therefrom, and to the top of which is insulatingly fastened a vibratable front capacitor plate 29 (FIGS. 13 and 14), for example by an insulating adhesive 30. The front plate is electrically connected to the source 25, for example, by a conductor 46. The surface 31 of the bulk semiconductor material, bounded by the ring 28 to which time front capacitor plate is fastened, forms the back capacitor plate.

The surface region 32 of the bulk material between the transistor ring provides a convenient site for the laying down by known techniques of the resistances 5 and 8 of FIG. 1 in the form of solid state circuit components. It is to be understood that a suitable insulating layer 43 is first deposited or formed on the surface region 32 to isolate electrically the resistors 44 from the surface 32 of the semiconductor.

In both forms of construction, the cavity between the front and back capacitor plates may be connected to the external atmosphere by providing one or more apertures 45 through the body of the slice and communicating with the space between the plates. Such apertures may serve to equalize pressure with temperature changes, and/or to serve an acoustic function in the case of a microphone, according to the required directionality of response of the transducer, i.e. whether it is required to have a pressure, pressure gradient or intermediate response.

Instead of the described junction field effect transistor construction, other forms of semiconductor amplifier such as a metal oxide semiconductor (MOS) field effect transistor may be used for amplifying the transducer electrical output.

The MOS field effect transistor may be operated in either the enhancement or the depletion mode by suitable biasing.

Figure 17:
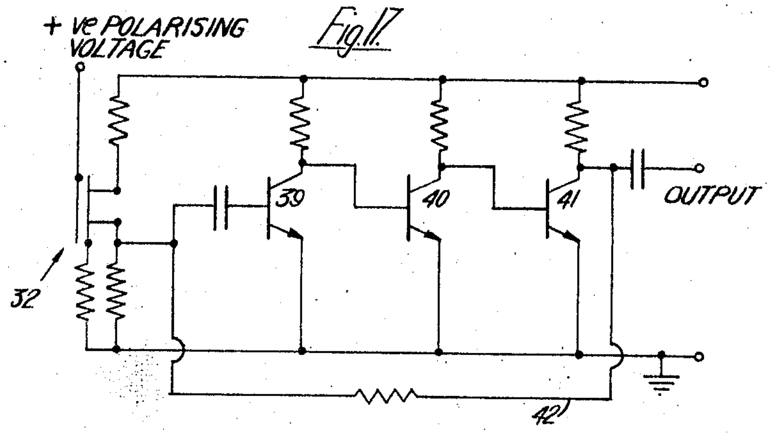
FIG. 17 is a circuit diagram of the transducer of FIG. 1 associated with another form of multi-stage amplifier.

The arrangements so far described are of a completely integral construction of electrostatic transducer and preamplifier. Such a unit would normally be used in conjunction with a multi stage amplifier proper, and examples of a complete operating unit are shown in FIGS. 15 and 17.

Figure 15:
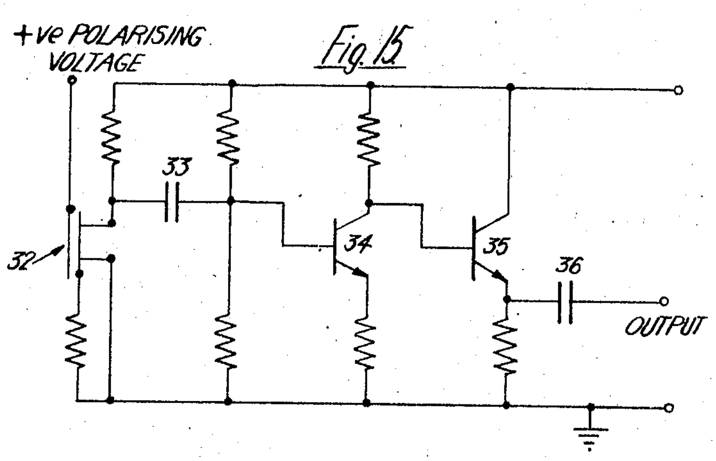
FIG. 15 is a circuit diagram of the transducer of FIG. 1 associated with one form of multi-stage amplifier.

In FIG. 15 the transducer and field effect transistor unit 32 feeds via a capacitor 33 into a transistor amplifying stage 34 and emitter follower low impedance output stage 35 including a capacitor 36.

The complete transistor amplifier may be laid down on the bulk material of the field effect transistor in the form of solid state circuit components in a integrated construction. If the values of the capacitor 33 and 36 are too high for convenient integral fabrication, they may be added on separately.

Figure 16:
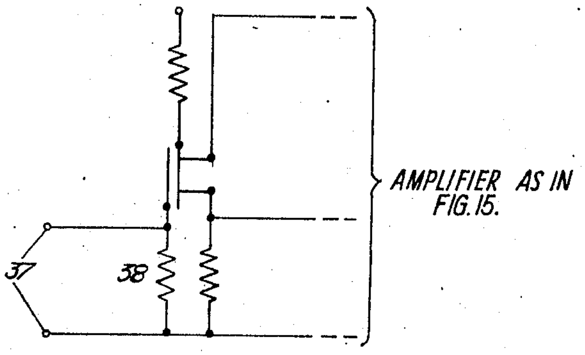
FIG. 16 is a circuit diagram of a modified first stage for the circuit of FIG. 15.

FIG. 16 shows a modification to the input of FIG. 15 where it is required to inject a calibrating voltage at terminals 37 with a small calibrating resistance 38 included in the earthy side.

In FIG. 17 the transducer and preamplifier 32 is followed by a three stage directly coupled transistor amplifier 39 and with a negative feedback at 42.

As with FIG. 15, all the components of the transistor amplifier may be so laid down on the bulk material of the semiconductor preamplifier in the form of solid state circuit components in an integrated construction.

It is to be understood that the foregoing description of specific examples of this invention is made by way of example only and is not to be considered as a limitation on its scope.

What we claim is:

1. An electromechanical transducer of the electrostatic type including a vibratable front capacitor plate, a field effect semiconductor amplifier device formed of a body of semiconductor material for amplifying the electrical output of the transducer, said field effect semiconductor amplifier including a gate electrode having a surface spaced from said front plate and serving as the back plate of said capacitor, and means for electrically connecting said front plate to the source electrode of said field effect transistor.

2. A transducer as claimed in claim 1 in which the front capacitor plate is peripherally fastened to the semiconductor body.

3. A transducer as claimed in claim 1 in which one or more apertures are provided through the semiconductor body communicating with space between the front and back capacitor plates.

4. A transducer as claimed in claim 1 in which the body of semiconductor material has an insulating surface on which is provided one or more solid state circuit components associated with the semiconductor amplifier device.

5. A transducer as claimed in claim 1 in which the semiconductor body is disc shaped with a continuous circular wall extending from each major surface of the disc, in which the wall extending from one major surface constitutes the source and the wall extending from the other major surface constitutes the drain of the field effect transistor, with an interconnecting channel extending between the walls, in which the remainder of the disc constitutes the gate of the field effect transistor, in which the surface of the disc bounded by the source wall forms the back capacitor plate, and in which the front capacitor plate is conductively coupled to the top of the source wall.

6. A transducer as claimed in claim 1 in which the semiconductor body is disc shaped with a continuous circular wall extending from each major surface of the disc, the wall extending from one major surface having formed on one side thereof the source and on the other side of said last mentioned wall the drain of the field effect transistor with the interconnecting channel extending across the wall, in which the remainder of the disc constitutes the gate of the field effect transistor, in which the surface of the disc bounded by the gate wall extending from the other major surface forms the back capacitor plate, and in which the front capacitor plate is insulatingly fastened to the top of the gate wall.

References Cited

UNITED STATES PATENTS

| | | | |
|---|---|---|---|
| 2,754,431 | 7/1956 | Johnson | 317—235.21 |
| 3,016,752 | 1/1962 | Huebschmann | 317—234 |
| 3,108,162 | 10/1963 | Schindler | 179—111 |
| 3,274,462 | 9/1966 | Pullen | 317—235.21 |
| 3,287,506 | 11/1966 | Hahnlein | 179—110.2 |
| 3,300,585 | 1/1967 | Reedyk et al. | |

KATHLEEN H. CLAFFY, *Primary Examiner.*

V. C. WILKS, *Assistant Examiner.*

U.S. Cl. X.R.

179—106, 110, 121; 317—234